US012452821B2

(12) United States Patent
Kweon

(10) Patent No.: US 12,452,821 B2
(45) Date of Patent: Oct. 21, 2025

(54) METHOD AND APPARATUS FOR RESTRICTING TERMINAL REGISTRATION FOR TERMINAL ONBOARDING IN WIRELESS COMMUNICATION SYSTEM

(71) Applicant: Samsung Electronics Co., Ltd., Suwon-si (KR)

(72) Inventor: Kisuk Kweon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 477 days.

(21) Appl. No.: 17/952,867

(22) Filed: Sep. 26, 2022

(65) Prior Publication Data

US 2023/0116184 A1    Apr. 13, 2023

(30) Foreign Application Priority Data

Oct. 8, 2021  (KR) .......................... 10-2021-0134471

(51) Int. Cl.
*H04W 8/18*    (2009.01)
*H04W 60/04*   (2009.01)

(52) U.S. Cl.
CPC ............. *H04W 60/04* (2013.01); *H04W 8/18* (2013.01)

(58) Field of Classification Search
CPC ..... H04W 60/00; H04W 60/06; H04W 12/10; H04W 12/12; H04W 36/14; H04W 12/71; H04W 12/72; H04W 48/02; H04W 48/10; H04W 60/04; H04W 8/18; H04W 84/06; H04W 8/20; H04W 8/08; H04W 88/00; H04W 88/02; H04W 88/08; H04W 8/02;

(Continued)

(56) References Cited

U.S. PATENT DOCUMENTS 11,206,629 B2 * 12/2021 Kim ...................... H04W 60/02
11,546,833 B2 *  1/2023 Saxena et al. ........ H04W 48/02
(Continued)

FOREIGN PATENT DOCUMENTS

| KR | 10-2019-0060667 | 6/2019 | |
| WO | WO 2020225673 A1 * | 11/2020 | ............ H04W 12/10 |
| WO | WO 2021195075 A1 * | 9/2021 | ............ H04W 48/12 |

OTHER PUBLICATIONS (KR 20210036230 A), Apparatus And Method For Access Control In Wireless Communication System (see abstract) (Year: 2021).*

(Continued)

*Primary Examiner* — Nathan S Taylor
(74) *Attorney, Agent, or Firm* — Jefferson IP Law, LLP

(57) ABSTRACT

A $5^{th}$ generation (5G) or $6^{th}$ generation (6G) communication system for supporting a higher data transmission rate is provided. Also, a method performed by an access and mobility management function (AMF) entity is provided. The method includes after performing a deregistration process with respect to user equipment (UE) registration for onboarding of a first UE, storing information about the first UE and starting a timer, while the timer is running, receiving, from a second UE, a UE registration request message for onboarding of the second UE, and based on the stored information, rejecting the UE registration request message, when the first UE and the second UE are the same as each other.

15 Claims, 8 Drawing Sheets

(58) Field of Classification Search
CPC ......... H04W 8/04; H04W 8/06; H04W 60/02;
H04W 12/00; H04W 12/08; H04W
12/122; H04W 12/40; H04W 12/61;
H04W 12/30; H04W 12/121; H04W
12/126; H04W 60/005; H04W 88/06;
H04W 36/0033; H04W 48/18; H04W
8/26; H04W 36/0066; H04W 36/32;
H04W 48/16; H04W 68/12; H04W 76/10;
H04W 76/11; H04W 76/25; H04W
84/042; H04W 88/14; H04W 36/00;
H04W 84/04; H04L 69/28; H04L 9/3268;
H04L 12/4679; H04L 65/1073; H04L
67/54; H04L 12/28
USPC .......................................... 370/252; 455/435.1
See application file for complete search history.

(56) References Cited

U.S. PATENT DOCUMENTS

| | | | |
|---|---|---|---|
| 2018/0227872 A1* | 8/2018 | Li et al. ............... | H04W 60/04 |
| 2018/0376445 A1 | 12/2018 | Yoon et al. | |
| 2019/0007992 A1* | 1/2019 | Kim et al. ............ | H04W 76/27 |
| 2019/0059067 A1* | 2/2019 | Lee et al. ............. | H04W 60/04 |
| 2019/0174449 A1* | 6/2019 | Shan et al. ........... | H04W 60/04 |
| 2020/0162919 A1* | 5/2020 | Velev et al. ......... | H04W 12/0804 |
| 2020/0229069 A1* | 7/2020 | Chun ................... | H04W 48/04 |
| 2021/0051577 A1* | 2/2021 | Won .................... | H04W 48/18 |
| 2021/0058784 A1* | 2/2021 | Kedalagudde et al. ..................... H04W 12/06 | |
| 2021/0099968 A1* | 4/2021 | Tiwari et al. ..... | H04W 60/0054 |
| 2021/0211975 A1 | 7/2021 | Prabhakar et al. | |
| 2021/0368421 A1* | 11/2021 | Yenkataraman et al. .................... H04W 48/06 | |
| 2022/0078696 A1* | 3/2022 | Saxena et al. ....... | H04W 48/02 |
| 2022/0256450 A1* | 8/2022 | Kuge .................. | H04W 48/18 |
| 2022/0330022 A1* | 10/2022 | Kolekar ............. | H04W 12/069 |
| 2022/0353680 A1* | 11/2022 | Hu ..................... | H04W 12/069 |
| 2023/0043899 A1* | 2/2023 | Kweon ............... | H04W 76/12 |
| 2023/0053127 A1* | 2/2023 | Sugawara ........... | H04W 24/04 |
| 2023/0075285 A1* | 3/2023 | Jung .................. | H04W 48/18 |
| 2023/0397147 A1* | 12/2023 | Kawasaki ........... | H04W 60/04 |
| 2024/0179661 A1* | 5/2024 | Zhu .................... | H04W 60/06 |
| 2024/0306085 A1* | 9/2024 | Izumi ................. | H04W 48/18 |
| 2024/0314720 A1* | 9/2024 | Sethi .................. | H04W 8/205 |
| 2024/0373332 A1* | 11/2024 | Izumi ................. | H04W 88/02 |

OTHER PUBLICATIONS (WO 2019098496 A1), Method for Registering, to Network System, Terminal Capable of Accessing Plurality of Access Networks (see title; abstract) (Year: 2019).*

(WO 2021085568 A1), Next, the case where the first condition determination is false will be described. AMF sends a Registration reject message to the UE via 5GAN (gNB) as a response message to the registration request message (S614) (see Description, 15th paragraph) (Year: 2021).*

'3GPP; TSG CT; Non-Access-Stratum (NAS) protocol for 5G System (5GS); Stage 3; (Release 17)', 3GPP TS 24.501 V17.4.1, Sep. 27, 2021.

Huawei et al., 'Slice handling for SNPN onboarding', C1-215158, 3GPP TSG-CT WG1 Meeting #131-e, E-meeting, Aug. 26, 2021.

International Search Report and written opinion dated Jan. 10, 2023, issued in International Application No. PCT/KR2022/014356.

3GPP; 3rd Generation Partnership Project; Technical Specification Group Services and System Aspects; Study on enhanced security support for Non-Public Networks; (NPN); (Release 17); 3GPP TR 33.857; V0.7.0; (Sep. 2021); XP052063864; Valbonne, France; Sep. 6, 2021.

VIVO et al.; De-registration for SNPN onboarding registered UR; 3GPP TSG-CT WG1 Meeting #130-e; C1-213857; Electronic meeting; May 20-28, 2021; XP052015430; May 27, 2021.

Extended European Search Report dated Nov. 27, 2024; European Appln. No 22878795.8-1215 / 4399915 PCT/KR2022014356.

* cited by examiner

METHOD AND APPARATUS FOR RESTRICTING TERMINAL REGISTRATION FOR TERMINAL ONBOARDING IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0134471, filed on Oct. 8, 2021, in the Korean Intellectual Property Office, the disclosure of which is incorporated by reference herein in its entirety.

BACKGROUND

1. Field

The disclosure relates to a communication system and a method of restricting malicious access by a user equipment (UE) to an onboarding network during UE onboarding.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in millimeter wave (mmWave), supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

As various services can be provided due to the aforementioned development of mobile communication systems, there is a demand for a method for efficiently using a non-public network (NPN).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for effectively providing a service in a wireless communication system.

Additional aspects will be set forth in part in the description which follows and, in part, will be apparent from the description, or may be learned by practice of the presented embodiments.

In accordance with an aspect of the disclosure, a method performed by an access and mobility management function (AMF) entity in a wireless communication system is provided. The method includes, after performing a deregistration process with respect to user equipment (UE) registration for onboarding of a first UE, storing information about the first UE and starting a timer, while the timer is running, receiving, from a second UE, a UE registration request message for onboarding of the second UE, and based on the stored information, rejecting the UE registration request message, when the first UE and the second UE are the same UE.

In accordance with another aspect of the disclosure, a method performed by an equipment identity register (EIR) entity in a wireless communication system is provided. The method includes receiving, from an access and mobility management function (AMF) entity, a message for requesting the EIR entity to store information with respect to a first user equipment (UE) identifier, storing the information with respect to the first UE identifier and starting a timer, while the timer is running, receiving, from the AMF entity, a message for requesting the EIR entity to store information with respect to a second UE identifier, and when the second UE identifier corresponds to the first UE identifier, transmitting, to the AMF entity, a response message including information indicating to the AMF entity to reject a UE registration request for onboarding of a UE corresponding to the second UE identifier.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
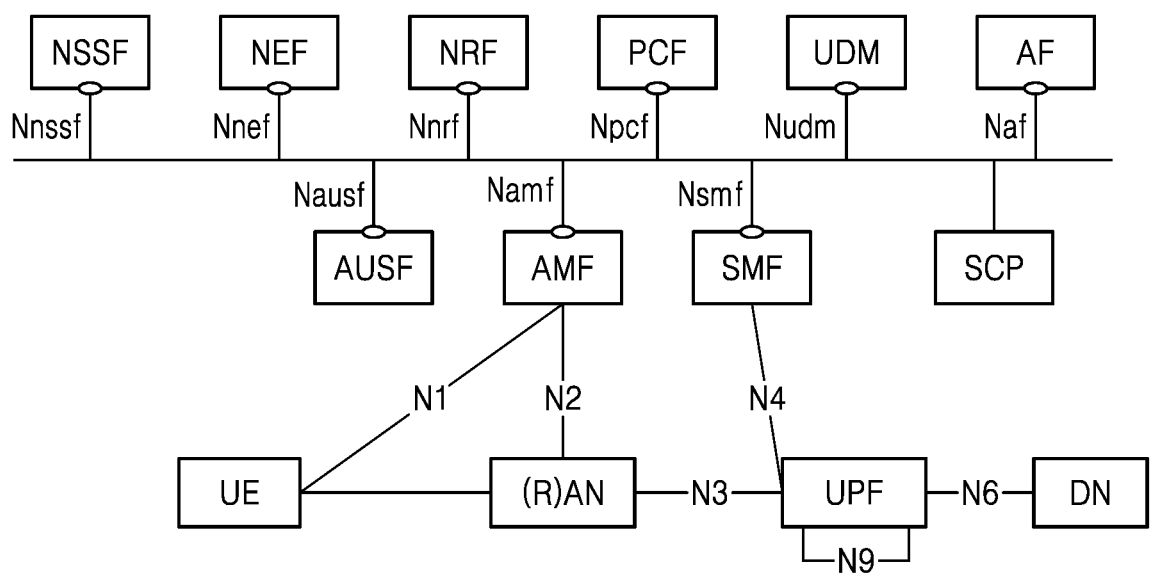
FIG. 1 illustrates a structure of a $5^{th}$ generation (5G) network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Throughout the specification, a layer may also be referred to as an entity.

In the following description of an embodiment of the disclosure, descriptions of techniques that are well known in the art and not directly related to the disclosure are omitted. By omitting unnecessary descriptions, the essence of the disclosure may not be obscured and may be explicitly conveyed.

For the same reason, one or more components in the accompanying drawings may be exaggerated, omitted, or schematically illustrated. Also, the size of each element may not fully reflect the actual size. In each drawing, the same reference numerals are given to the same or corresponding elements.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments of the disclosure set forth herein; rather these embodiments of the disclosure are provided so that this disclosure will be thorough and complete, and will fully convey the scope of the disclosure only defined by the claims to one of ordinary skill in the art. Like reference numerals refer to like elements throughout the specification.

Here, it may be understood that respective blocks and combinations of the blocks in processing flowcharts will be performed by computer program instructions. The computer program instructions may be loaded on a processor of a universal computer, a special-purpose computer, or other programmable data processing equipment, and thus they generate means for performing functions described in the block(s) of the flowcharts when executed by the processor of the computer or other programmable data processing equipment. The computer program instructions may be stored in a computer-executable or computer-readable memory capable of directing a computer or another programmable data processing apparatus to implement a function in a particular manner, and thus the instructions stored in the computer-executable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

Furthermore, each block may represent a module, segment, or a part of code including one or more executable instructions to perform particular logic function(s). It should also be noted that the functions described in the blocks may occur out of order in alternate embodiments of the disclosure. For example, two blocks illustrated successively may actually be executed substantially concurrently, or the blocks may sometimes be performed in a reverse order according to the corresponding function.

Here, the term "unit" in the embodiment of the disclosure means a software component or hardware component such as a field-programmable gate array (FPGA) or an application-specific integrated circuit (ASIC), and performs a specific function. However, the "unit" is not limited to the software or hardware. The "unit" may be configured to be stored in an addressable storage medium, or to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. Functions served by components and "units" may be combined into a smaller number of components and the "units" or further divided into a greater number of components and "units." Moreover, the components and the "units" may be implemented to execute one or more central processing units (CPUs) in a device or security multimedia card.

Hereinafter, a base station is an entity configured to allocate a resource for a terminal and may be at least one of a Node B, a base station (BS), an eNode B (eNB), a gNode B (gNB), a radio access unit, a base station controller, or a node on a network. Examples of a terminal may include a user equipment (UE), a mobile station (MS), a cellular phone, a smartphone, a computer, and a multimedia system capable of performing a communication function. Also, an embodiment of the disclosure may also be applied to other communication systems having similar technical backgrounds or channel types as those of the embodiment of the disclosure described hereinafter. Also, an embodiment of the disclosure is applicable to other communication systems through modification at the discretion of one of ordinary skill in the art without greatly departing from the scope of the disclosure.

In the following description, terms for identifying access nodes, terms referring to network entities (NEs) or network functions (NF), terms referring to messages, terms referring to interfaces between NEs, terms referring to various identification information, and the like are used for convenience of description. Accordingly, the disclosure is not limited to terms to be described below, and other terms indicating objects having equal technical meanings may be used.

Hereinafter, for convenience of description, some of terms and names defined by the $3^{rd}$ Generation Partnership Project (3GPP) Long Term Evolution (LTE) standard may be used. However, the disclosure is not limited to these terms and names, and may be equally applied to wireless communication systems conforming to other standards.

In particular, the disclosure may be applied to 3GPP NR ($5^{th}$ generation (5G) mobile communication standard). The disclosure is applicable to intelligent services (e.g., smart home, smart building, smart city, smart car or connected car, healthcare, digital education, retail trade, security, and safety services) based on 5G communication technologies and Internet of things (IoT)-related technologies. In the disclosure, an eNB may be interchangeably used with a gNB for convenience of description. That is, a base station described as the eNB may represent the gNB. Also, the term "terminals" may refer to not only mobile phones, narrowband (NB)-IoT devices, and sensors but also other wireless communication devices.

A wireless communication system has evolved from a system providing voice-oriented services to a broadband wireless communication system providing high speed high quality packet data services of communication standards such as High Speed Packet Access (HSPA) of 3GPP, LTE or Evolved Universal Terrestrial Radio Access (E-UTRA), long term evolution advanced (LTE-A), LTE-Pro, High Rate Packet Data (HRPD) of 3GPP2, Ultra Mobile Broadband (UMB), and Institute of Electrical and Electronics Engineers (IEEE) 802.16e.

In an LTE system as a representative example of a broadband wireless communication system, an orthogonal frequency division multiplexing (OFDM) scheme is employed in a downlink (DL), and a single carrier frequency division multiple access (SC-FDMA) scheme is employed in an uplink (UL). The uplink is a radio link through which a terminal (e.g., a UE or an MS) transmits data or a control signal to a base station (e.g., an eNode B or a BS), and the downlink is a radio link through which the base station transmits data or a control signal to the terminal. In the multiple access scheme, time-frequency resources for carrying data or control information are allocated and operated in a manner to prevent overlapping of the resources, i.e., to establish orthogonality between users so as to identify data or control information of each user.

As post-LTE systems, i.e., 5G systems need to support services capable of freely reflecting and simultaneously satisfying various requirements of users, service providers, and the like. Services considered for the 5G systems include enhanced mobile broadband (eMBB), massive machine-type communication (mMTC), ultra-reliability low-latency communication (URLLC) services, or the like.

According to some embodiments of the disclosure, the eMBB is aimed at providing more enhanced data rates than the LTE, LTE-A or LTE-Pro may support. For example, in a 5G communication system, the eMBB should be able to provide a peak data rate of 20 Gbps in a DL and a peak data rate of 10 Gbps in an UL at one BS. Also, it may be required for the 5G communication system to simultaneously provide a peak data rate and an increased user-perceived data rate of a terminal. To satisfy these requirements, the 5G communication systems may require various enhanced transmission/reception technologies including enhanced multiple-input and multiple-output (MIMO). Also, a data rate required in the 5G communication system may be satisfied as the 5G communication system uses a frequency bandwidth wider than 20 MHz in the 3 GHz to 6 GHz or 6 GHz or more frequency band, while the legacy LTE transmits a signal by using a maximum 20 MHz transmission bandwidth in the 2 GHz band.

Simultaneously, the mMTC is being considered to support application services such as IoT in 5G communication systems. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and various devices to provide communication functions. Also, because a terminal supporting the mMTC is likely to be located in a shadow region failing to be covered by the cell, such as the basement of a building, due to the characteristics of the service, the terminal may require wider coverage than other services provided by the 5G communication systems. The terminal supporting the mMTC should be configured as a low-cost terminal and may require a very long battery life time such as 10 to 15 years because it is difficult to frequently replace the battery of the terminal.

Lastly, the URLLC refers to cellular-based wireless communication services used for mission-critical purposes such as services for remote control of robots or machinery, industrial automation, unmanned aerial vehicles, remote health care, emergency alerts, and the like. Accordingly, the URLLC should provide communications providing very low latency (ultra-low latency) and very high reliability (ultra reliability). For example, services supporting URLLC should meet an air interface latency of less than 0.5 milliseconds and simultaneously have a requirement of a packet error rate of $10^{-5}$ or less. Thus, for the service supporting the URLLC, the 5G system should provide a transmit time interval (TTI) smaller than other services and simultaneously has a design requirement for allocating wide resources in a frequency band so as to assure reliability of a communication link.

Three services considered for the 5G communication system, that is, eMBB, URLLC, and mMTC, may be multiplexed and transmitted in one system. In order to satisfy different requirements of the services, different transmission and reception schemes and transmission/reception parameters may be used for the services. However, the above-described mMTC, URLLC, and eMBB are merely examples of different service types, and the service types to which the disclosure is applied are not limited thereto.

Also, although an embodiment of the disclosure is described by using the LTE, LTE-A, LTE Pro, or 5G (or NR) system, the embodiment of the disclosure may be applied to other communication systems having a similar technical background or channel type. Also, it will be understood by one of ordinary skill in the art that an embodiment of the disclosure may be applied to other communication systems through some modifications without departing from the scope of the disclosure.

FIG. 1 illustrates a structure of a 5G network according to an embodiment of the disclosure.

NEs or network nodes included in the 5G network are described as below.

A (radio) access network ((R)AN) is an entity configured to perform wireless resource assignment for a terminal and may be at least one of an eNode B, a Node B, a BS, a next-generation (NG) RAN, a 5G-AN, a radio access unit, a base station controller, or a node on a network. Examples of a terminal may include a UE, an NG UE, an MS, a cellular phone, a smartphone, a computer, and a multimedia system capable of performing a communication function. Also, an embodiment of the disclosure is described with the example of a 5G system, hereinafter. However, the embodiment of the disclosure may be applied to other communication systems having similar technical backgrounds. In addition, the embodiment of the disclosure may be applied to other communication systems by including some modifications that are made within a range not to significantly deviate from the scope of the disclosure based on the determination of one of ordinary skill in the art.

As a wireless communication system has evolved from a $4^{th}$ generation (4G) system to a 5G system, a new core network, that is, an NG core or 5G core (5GC) network has been defined. The new core network has virtualized all previous NEs to network functions (NFs). According to an embodiment of the disclosure, an NF may denote an NE, a network component, or a network resource.

According to an embodiment of the disclosure, the 5GC may include NFs illustrated in FIG. 1. However, it is not limited to the examples of FIG. 1. The 5GC may include more or less NFs than the NFs illustrated in FIG. 1.

According to an embodiment of the disclosure, an access and mobility management function (AMF) may be an NF configured to manage mobility of a UE.

According to an embodiment of the disclosure, a session management function (SMF) may be an NF configured to manage packet data network (PDN) connection provided to a UE. The PDN connection may be referred to as a packet data unit (PDU) session.

According to an embodiment of the disclosure, a policy control function (PCF) may be an NF configured to implement a service policy, a charge policy, and a PDU session policy of a mobile communication operator with respect to a UE.

According to an embodiment of the disclosure, unified data management (UDM) may be an NF configured to store information about a subscriber.

According to an embodiment of the disclosure, a network exposure function (NEF) may be a function configured to provide information about a UE to a server outside a 5G network. Also, the NEF may provide a function of providing the 5G network with information required for a service and storing the information in a unified data repository (UDR).

According to an embodiment of the disclosure, a user plane function (UPF) may be a function configured to serve as a gateway for transmitting user data (a PDU) to a data network (DN).

According to an embodiment of the disclosure, a network repository function (NRF) may perform a function of discovering an NF.

According to an embodiment of the disclosure, an authentication server function (AUSF) may perform UE authentication in a 3GPP access network and a non-3GPP access network.

According to an embodiment of the disclosure, a network slice selection function (NSSF) may perform a function of selecting a network slice instance provided to a UE.

According to an embodiment of the disclosure, the DN may be a data network through which the UE may transceive data to use a service of a network operator or a $3^{rd}$ party service.

Figure 2:
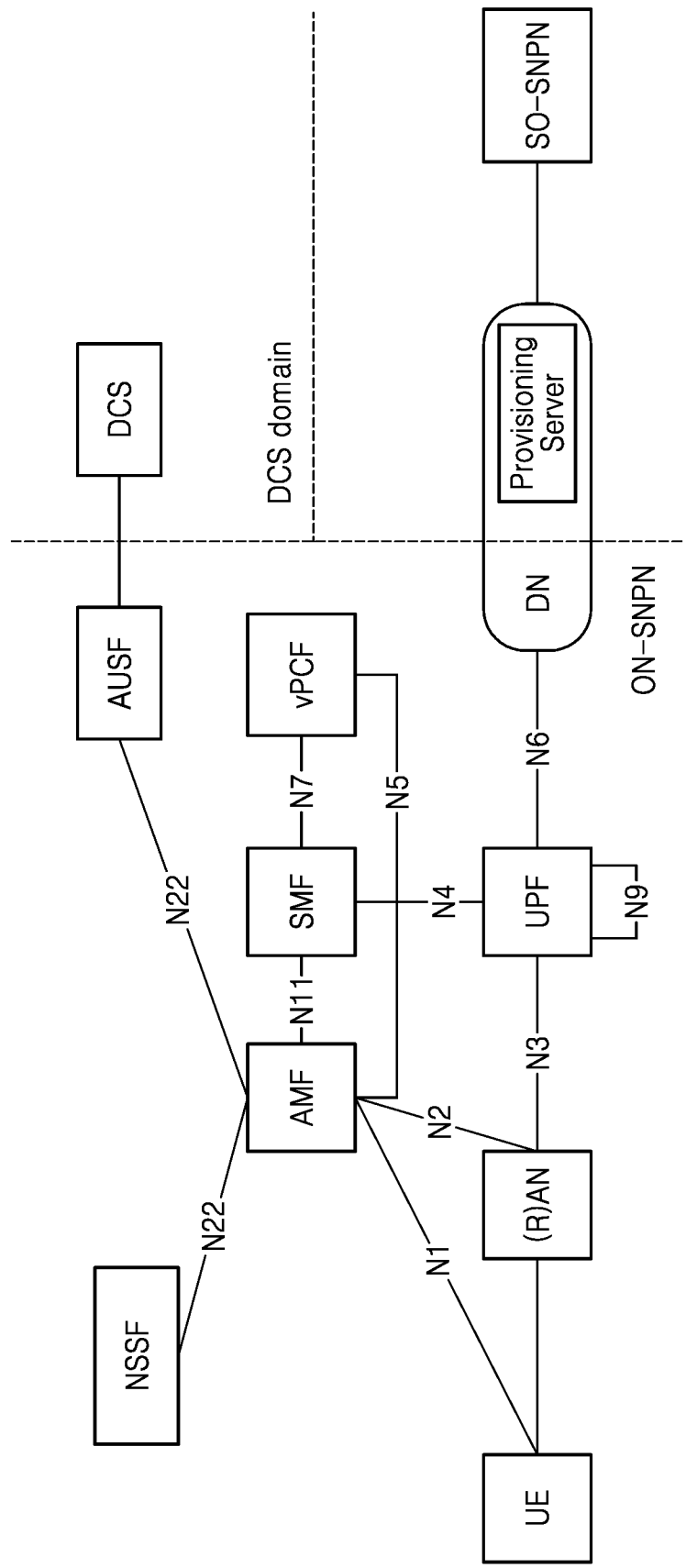
FIG. 2 illustrates a structure of a wireless communication system including an onboarding stand-alone non-public network (ON-SNPN), a default credentials server (DCS), and a subscription owner stand-alone non-public network (SO-SNPN) according to an embodiment of the disclosure.

FIG. 2 illustrates a structure of a wireless communication system including an onboarding stand-alone non-public network (ON-SNPN), a default credentials server (DCS), and a subscription owner stand-alone non-public network (SO-SNPN) according to an embodiment of the disclosure.

Referring to FIG. 2, the wireless communication system for transmitting, to a UE, stand-alone non-public network (SNPN) credentials and user subscription data to access the SNPN may include the UE, the ON-SNPN, the DCS, a provisioning server (PVS), and the SO-SNPN containing the SNPN credentials and the user subscription data.

First, it is assumed that the UE does not have the SNPN credentials and the user subscription data, and the UE has default UE credentials assigned by the DCS. In addition, the DCS may assign, to the UE, a subscription permanent identifier (SUPI) for uniquely identifying the UE.

The ON-SNPN may provide, to the UE, user plane (UP)-based IP connectivity (UE onboarding) or control plane (CP)-based non-access stratum (NAS) connectivity (UE onboarding), so that the UE without the SNPN credentials and the user subscription data may download the SNPN credentials and the user subscription data. To determine whether or not to provide, to the UE, a UE onboarding service, the ON-SNPN may request UE authentication and authorization from the DCS. FIG. 2 illustrates the UP-based UE onboarding.

The DCS may pre-configure the default UE credentials and the SUPI for the UE and may store the pre-configured default UE credentials and SUPI. The DCS may receive, from the ON-SNPN, a request for authentication with respect to the UE, during registration for UE onboarding. Here, the authentication with respect to the UE may be performed by using the default UE credentials and the SUPI.

Also, to determine whether the UE has the authority to receive the SNPN credentials and the user subscription data, when the PVS transmits, to the UE, the SNPN credentials and the user subscription data, the DCS may receive, from the PVS, a request for authentication/authorization with respect to the UE. The DCS may be a manufacturer or the UE or a third party with which the manufacturer or an SNPN operator is associated.

The PVS may receive, from the SO-SNPN, the SNPN credentials and the user subscription data, such as user configuration information, and may transmit, to the UE, the SNPN credentials and the user subscription data, such as the user configuration information.

The PVS may be integrated with the DCS as one server, and like the DCS, may be a server owned by a third party with which the manufacturer of the UE or the SNPN operator is associated. The PVS may perform communication with the DCS for authentication/authorization of the UE.

The SO-SNPN having the SNPN credentials and the user subscription data may transmit, to the UE, the SNPN credentials and the user subscription data, through the PVS.

The ON-SNPN providing the UE onboarding may not have any information with respect to the UE. Thus, the ON-SNPN may have weakness in terms of blocking a UE attempting malicious UE onboarding registration (e.g., distributed denial-of-service (DDos) attack). According to the disclosure, provided is a method of solving malicious UE onboarding registration by having the ON-SNPN contain information about a UE having attempted UE onboarding registration for a predetermined period of time.

Figure 3:
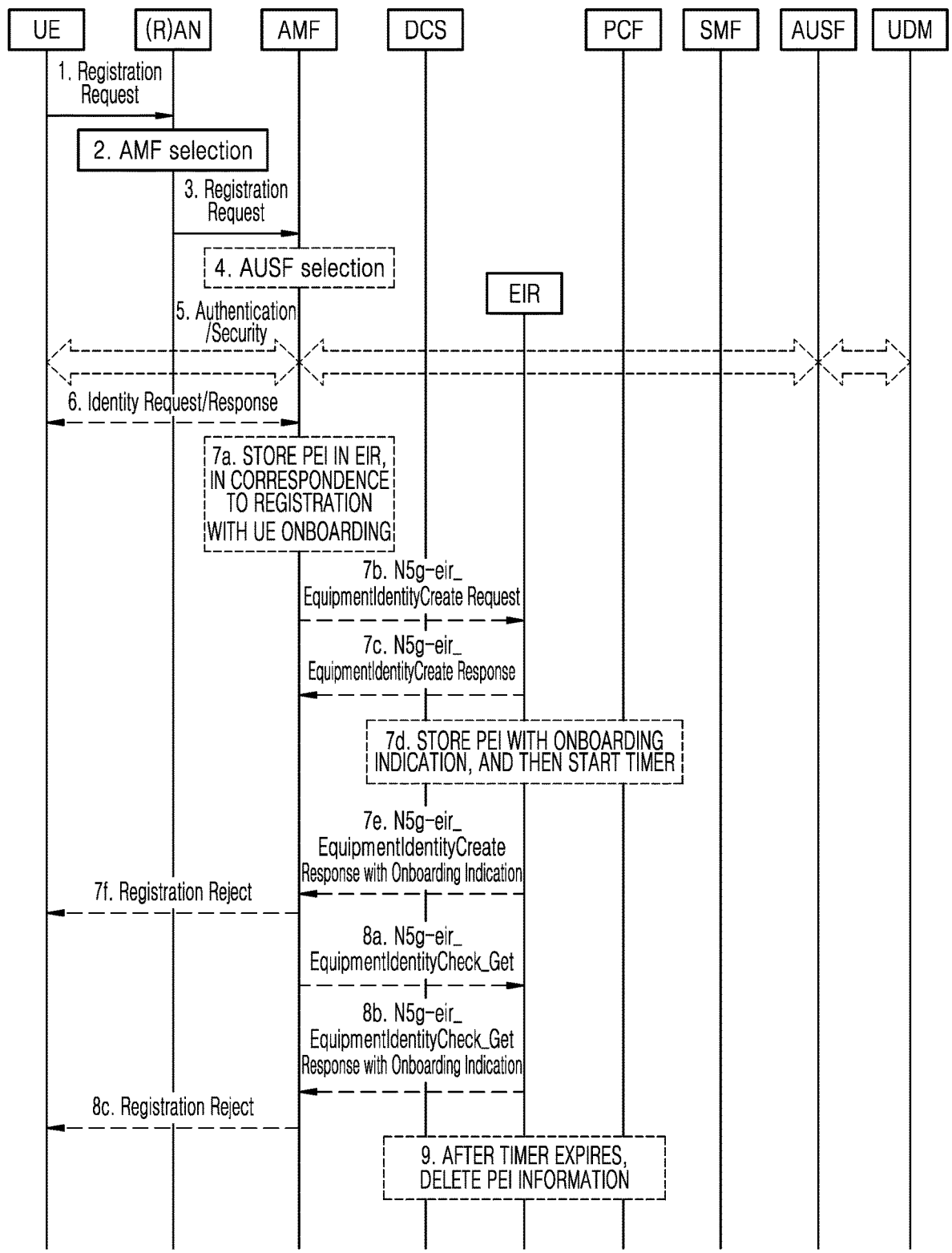
FIG. 3 illustrates a process in which a user equipment (UE) registers to an ON-SNPN for UE onboarding according to an embodiment of the disclosure.

FIG. 3 illustrates a process in which a UE registers to the ON-SNPN for UE onboarding according to an embodiment of the disclosure.

In operation 1, the UE may transmit, to an (R)AN, a registration request message for registration to the ON-SNPN for UE onboarding. For example, the (R)AN may include a base station.

In operation 2, the (R)AN may select an AMF for UE onboarding.

In operation 3, the (R)AN may transmit, to the AMF, the registration request message. For example, the (R)AN may transmit the registration request message to the AMF selected in operation 2.

In operation 4, the AMF may select an AUSF for authentication of the UE.

In operation 5, the AMF may perform UE authentication through a DCS server.

In operation 6, after the authentication, the AMF may request an international mobile equipment identity (IMEI) from the UE.

In operation 7a, when the UE is accessing the ON-SNPN for UE onboarding, the AMF may store a permanent equipment identifier (PEI) of the UE in an equipment identity register (EIR).

In operation 7b, in order to store the PEI of the UE in the EIR, the AMF may include the PEI of the UE in an N5g-eir_EquipmentIdentityCreate Request message and transmit the N5g_eir_EquipmentIdentityCreate Request message to the EIR. For example, the AMF may transmit, to the EIR, a message for requesting the EIR to store information about the PEI of the UE.

According to an embodiment of the disclosure, according to whether or not the PEI of the UE received from the AMF is the same as a PEI pre-stored in the EIR, the EIR may determine whether or not to include, in a response message, information indicating to reject the UE registration request for UE onboarding. Operation 7c and operation 7e described below may be selectively performed according to whether or not the EIR pre-stores the PEI of the UE, before the EIR receives, from the AMF, the PEI of the UE. In detail, operation 7c indicates an operation in which the EIR transmits, to the AMF, a response message including information indicating that the PEI of the UE is successfully stored, when the PEI of the UE is not pre-stored in the EIR, and operation 7e indicates an operation in which the EIR transmits, to the AMF, a response message including information indicating to reject the UE registration request for UE onboarding, when the PEI of the UE is pre-stored in the EIR.

In operation 7c, the EIR having received the N5g-eir_EquipmentIdentityCreate Request message may store the PEI of the UE and tag an onboarding indication on an N5g-eir_EquipmentIdentityCreate Response message. The EIR may transmit, to the AMF, a response message with respect to the message for requesting the EIR to store the information about the PEI of the UE. For example, the EIR may transmit, to the AMF, the N5g-eir_EquipmentIdentityCreate Response message. For example, the response message with respect to the message for requesting the EIR to store the information about the PEI of the UE may include information indicating that the PEI of the UE is successfully stored.

In operation 7d, the EIR having stored the PEI of the UE may start a timer for deleting the PEI of the UE. That is, as described below in operation 9, when the timer expires, the EIR may delete the stored PEI of the UE.

In operation 7e, when the received PEI of the UE is the same as the PEI pre-stored in the EIR, the EIR may include, in the N5g-eir_EquipmentIdentityCreate Response message, an onboarding indication, and transmit, to the AMF, the N5g-eir_EquipmentIdentityCreate Response message. For example, the N5g-eir_EquipmentIdentityCreate Response message may further include information indicating to reject the UE registration request for UE onboarding.

In detail, when the PEI of the UE, included in the message for requesting the EIR to store the information about the PEI of the UE, transmitted in operation 7b, is pre-stored in the EIR, the EIR may transmit, to the AMF, the response message including information indicating to reject the UE registration request for UE onboarding, in operation 7e.

In operation 7f, the AMF having received the response message may transmit, to the UE, a registration reject message, in order to reject UE registration for UE onboarding.

When operation 7e is not supported, operations 8a to 8c described below may be additionally performed. In detail, when the operation, in which, according to whether or not the PEI of the UE, included in the message for requesting the EIR to store the information about the PEI of the UE, is pre-stored in the EIR, the EIR transmits, to the AMF, the information indicating to reject the UE registration request for UE onboarding, is not performed, operations 8a to 8c may be additionally performed.

In operation 8a, the AMF may transmit, to the EIR, an N5g-eir_EquipmentIdentityCheck_Get message by including, in the N5g-eir_EquipmentIdentityCheck_Get message, the PEI of the UE. For example, the AMF may transmit, to the EIR, an equipment identifier check request message including the PEI of the UE.

In operation 8b, the EIR having received the N5g-eir_EquipmentIdentityCheck_Get message may check the received PEI of the UE, and when the EIR stores the PEI of the UE, the EIR may include, in an N5g-eir_EquipmentIdentityCheck_Get Response message, an onboarding indication, and transmit, to the AMF, the N5g-eir_EquipmentIdentityCheck_Get Response message. For example, when the EIR pre-stores a PEI, which is the same as the PEI included in the equipment identifier check request message, the EIR server may transmit, to the AMF, the equipment identifier check response message including the onboarding indication.

In operation 8c, the AMF having received the N5g-eir_EquipmentIdentityCheck_Get Response message may transmit a registration reject message to the UE to reject UE registration for UE onboarding.

In operation 9, when the timer started when the PEI of the UE is stored expires, the EIR may delete the stored information about the PEI of the UE.

Figure 4:
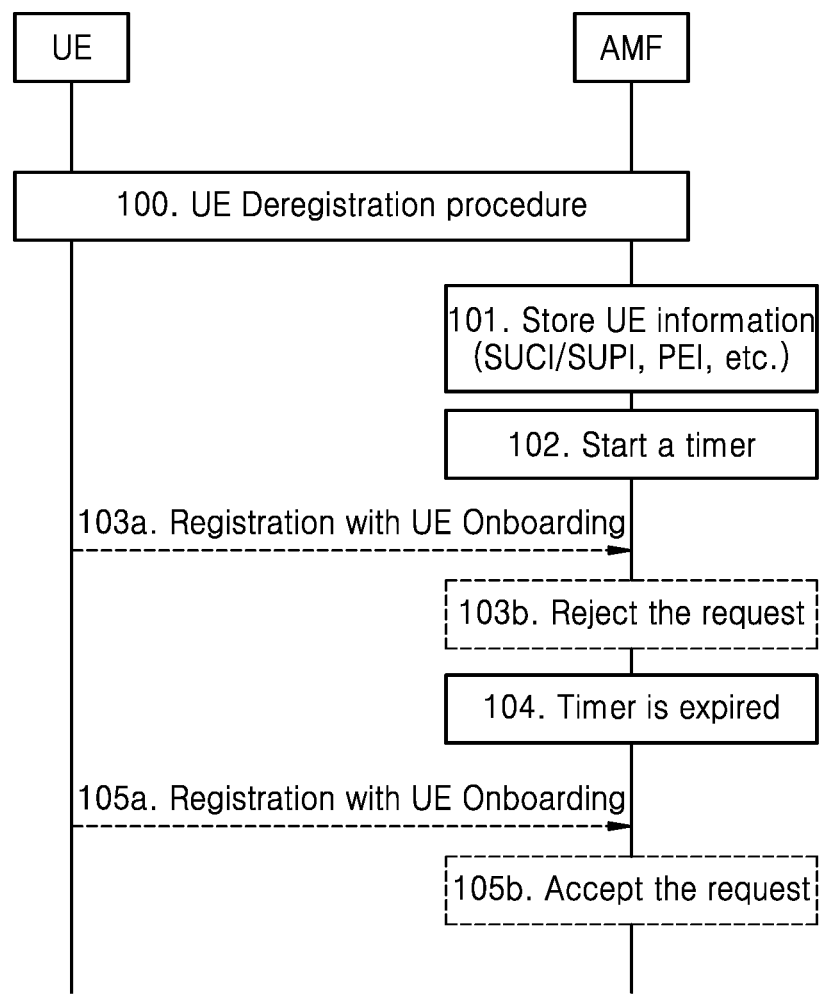
FIG. 4 illustrates a process in which, after an access and mobility management function (AMF) stores information about a UE in a deregistration process of the UE, the UE performs UE onboarding again according to an embodiment of the disclosure.

FIG. 4 illustrates a process in which UE performs UE onboarding again, after the AMF stores information about the UE in a UE deregistration process according to an embodiment of the disclosure.

In operation 100, the UE may perform the UE deregistration process, after the UE registration for onboarding.

In operation 101, after the UE deregistration process is completed, the AMF may store information (a subscription concealed identifier (SUCI), an SUPI, a PEI, etc.) about the UE on which UE onboarding is performed.

In operation 102, the AMF may start a timer to delete the stored information about the UE.

In operation 103a, the UE, on which the UE onboarding is performed, may perform registration to the SO-SNPN for UE onboarding, again. For example, the UE corresponding to the information about the UE, stored in operation 1, may request again registration of the UE to the SO-SNPN for UE onboarding, from the AMF.

In operation 103b, the AMF may identify that the stored information about the UE and the UE requesting the UE registration correspond to each other and may reject the UE registration request for UE onboarding. Here, the AMF may reset the timer that is in process.

In operation 104, the timer set to retain the UE information may expire, and the AMF may delete the stored information about the UE.

In operation 105a, the UE may request again registration of the UE to the SO-SNPN for UE onboarding.

In operation 105b, because the AMF has deleted the information about the corresponding UE with the expiration of the timer, the AMF may accept the registration request of the UE because the AMF does not have the information about the UE.

Figure 5:
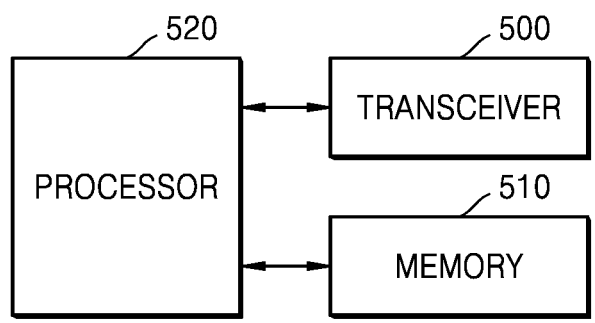
FIG. 5 is a diagram of components of a UE according to an embodiment of the disclosure.

FIG. 5 is a diagram of components of a UE according to an embodiment of the disclosure.

The UE according to an embodiment of the disclosure may include a processor 520 configured to control general operations of the UE, a transceiver 500 including a transmitter and a receiver, and a memory 510. However, it is not limited to the example described above. The UE may include more or fewer components than those illustrated in FIG. 5.

According to an embodiment of the disclosure, the transceiver 500 may transmit and receive signals to and from NEs or other UEs. The signals transmitted and received to and from the NEs may include control information and data. Also, the transceiver 500 may receive the signals through wireless channels and output the signals to the processor 520 and may transmit signals output from the processor 520 through the wireless channels.

According to an embodiment of the disclosure, the processor 520 may control the UE to perform any one operation in the embodiments described above. The processor 520, the memory 510, and the transceiver 500 may not necessarily have to be implemented as separate modules and may be implemented as one component, for example, as a single chip. Also, the processor 520 and the transceiver 500 may be electrically connected to each other. Also, the processor 520 may correspond to an application processor (AP), a communication processor (CP), a circuit, an application-specific circuit, or at least one processor.

According to an embodiment of the disclosure, the memory 510 may store data, such as basic programs for the operation of the UE, application programs, and configuration information. In particular, the memory 510 may provide the stored data in response to a request of the processor 520. The memory 510 may include a storage medium, such as read-only memory (ROM), random-access memory (RAM), a hard disk, compact disk (CD)-ROM, a digital versatile disk (DVD), etc., or a combination of the storage media. Also, the memory 510 may include a plurality of memories. Also, the processor 520 may execute the embodiments of the disclosure described above based on the programs stored in the memory 510, the programs being configured to execute the embodiments of the disclosure described above.

Figure 6:
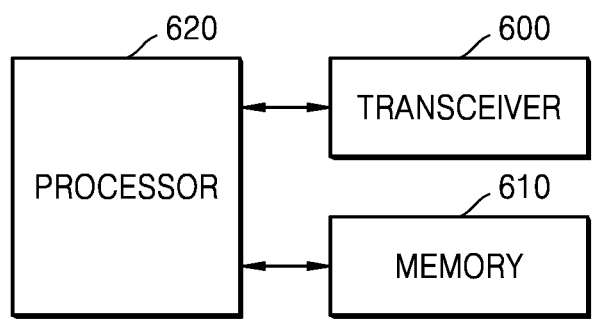
FIG. 6 is a diagram of components of a network entity according to an embodiment of the disclosure.

FIG. 6 is a diagram of components of an NE according to an embodiment of the disclosure.

The NE illustrated in FIG. 6 may include an AMF entity, an EIR entity, etc.

The NE according to an embodiment of the disclosure may include a processor 620 configured to control general operations of the NE, a transceiver 600 including a transmitter and a receiver, and a memory 610. However, it is not limited to the example described above. The NE may include more or fewer components than those illustrated in FIG. 6.

According to an embodiment of the disclosure, the transceiver 600 may transmit and receive signals to and from at least one of other NEs or the UE. The signals transmitted and received to and from the at least one of the other NEs or the UE may include control information and data.

According to an embodiment of the disclosure, the processor 620 may control the NE to perform any one operation in the embodiments described above. The processor 620, the memory 610, and the transceiver 600 may not necessarily have to be implemented as separate modules and may be realized as one component, for example, as a single chip. Also, the processor 620 and the transceiver 600 may be electrically connected to each other. Also, the processor 620 may correspond to an AP, a CP, an application-specific circuit, or at least one processor.

According to an embodiment of the disclosure, the memory 610 may store data, such as basic programs for the operation of the NE, application programs, and configuration information. In particular, the memory 610 may provide the stored data in response to a request of the processor 620. The memory 610 may include a storage medium, such as ROM, RAM, a hard disk, CD-ROM, a DVD, etc., or a combination of the storage media. Also, the memory 610 may include a plurality of memories. Also, the processor 620 may execute the embodiments of the disclosure described above based on the programs stored in the memory 610, the programs being configured to execute the embodiments of the disclosure described above.

Figure 7:
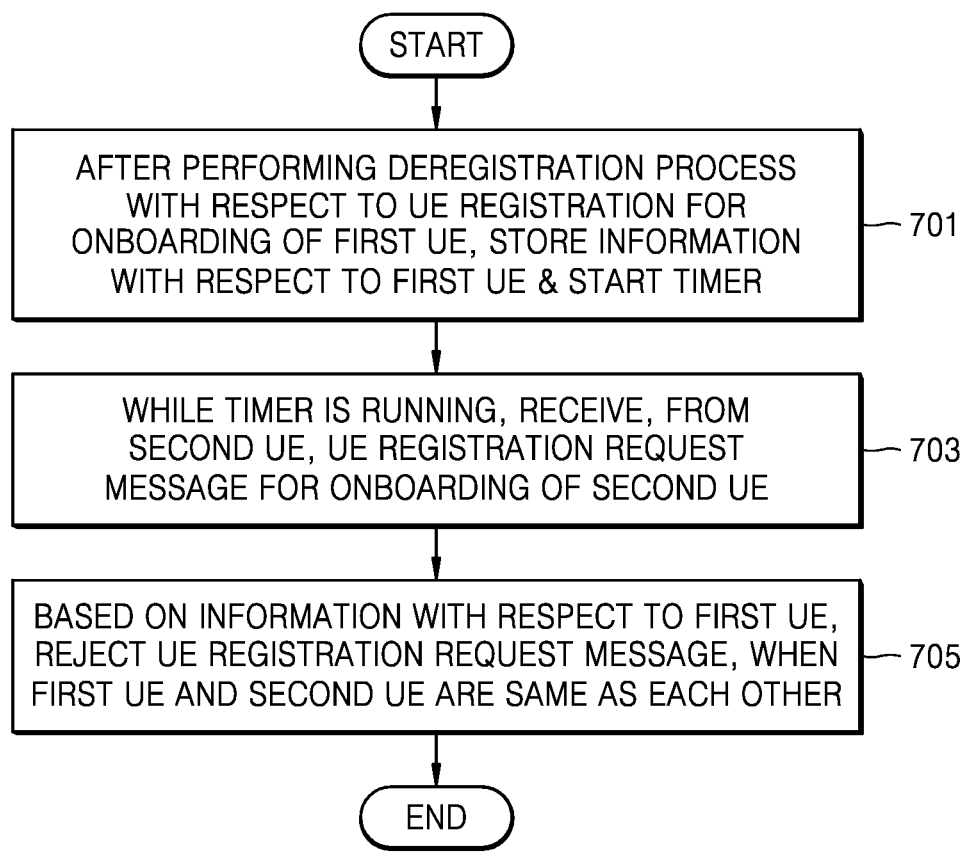
FIG. 7 is a flowchart of a method performed by an AMF entity, according to an embodiment of the disclosure.

FIG. 7 is a flowchart of a method performed by the AMF entity, according to an embodiment of the disclosure.

In operation 701, the AMF entity may perform a deregistration process with respect to UE registration for onboarding of a first UE, and then, may store information about the first UE and start a timer. According to an embodiment of the disclosure, the information about the first UE may include at least one of an SUCI, an SUPI, or a PEI.

In operation 703, while the timer is running, the AMF entity may receive, from a second UE, a UE registration request message for onboarding of the second UE.

In operation 705, when the first UE is the same as the second UE, based on the information about the first UE, the AMF entity may reject the UE registration request message.

According to an embodiment of the disclosure, after the timer expires, the AMF entity may receive, from a third UE, a UE registration request message for onboarding of the third UE, and may accept the UE registration request message for onboarding of the third UE. For example, the third UE may be the same as the first UE.

According to an embodiment of the disclosure, when the UE registration request message is rejected, the AMF entity may reset the timer.

Figure 8:
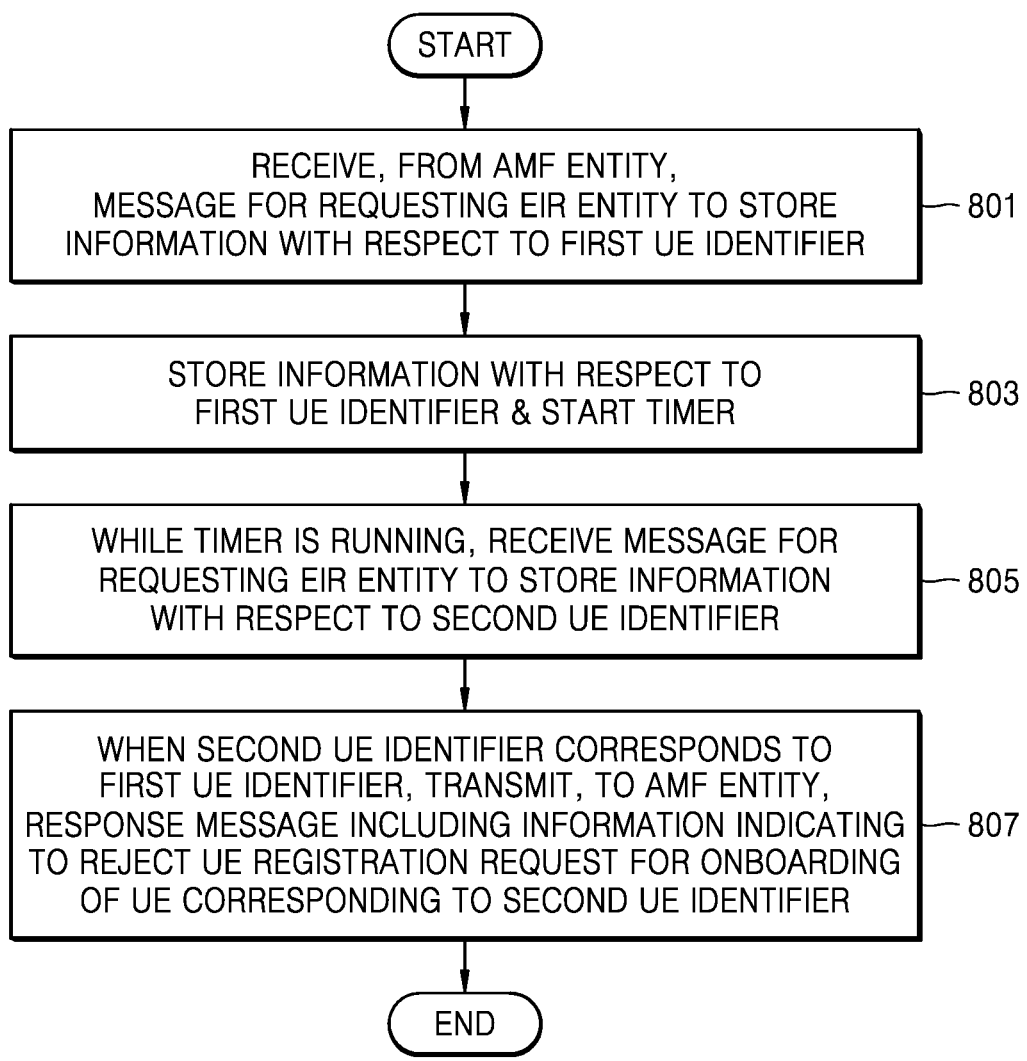
FIG. 8 is a flowchart of a method performed by an equipment identity register (EIR) entity, according to an embodiment of the disclosure.

FIG. 8 is a flowchart of a method performed by the EIR entity, according to an embodiment of the disclosure.

In operation 801, the EIR entity may receive, from the AMF entity, a message for requesting the EIR entity to store information about a first UE identifier. For example, the message for requesting the EIR entity to store the information about the first UE identifier may be received, when a UE registration process for onboarding of a UE corresponding to the first UE identifier, is performed.

According to an embodiment of the disclosure, the information about the first UE identifier may include a PEI.

In operation 803, the EIR entity may store the information about the first UE identifier and may start a timer. According to an embodiment of the disclosure, the EIR entity may tag an onboarding indication corresponding to the information about the first UE identifier.

In operation 805, while the timer is running, the EIR entity may receive, from the AMF entity, the message for requesting the EIR entity to store information about a second UE identifier.

In operation 807, when the second UE identifier corresponds to the first UE identifier, the EIR entity may transmit, to the AMF entity, a response message including information indicating to reject a UE registration request for onboarding of a UE corresponding to the second UE identifier. According to an embodiment of the disclosure, the response message may further include an onboarding indication, or the information indicating to reject the UE registration for onboarding of the second UE may include the onboarding indication.

According to an embodiment of the disclosure, when the timer expires, the EIR entity may delete the information about the first UE identifier.

It should be noted that the above-described diagrams, the example diagrams of the transmission method of control/data signals, the example diagrams of the operation procedure, and the diagrams are not intended to limit the scope of the claims of the disclosure. That is, it shall not be interpreted that all components, entities, or operations described in the embodiment of the disclosure are essential configurations for executing the disclosure, and the disclosure may be realized to an extent to which the essence of the disclosure is not deteriorated, by including only some of the configurations described above. Furthermore, the embodiments of the disclosure may be combined to be implemented, if necessary. For example, portions of the methods provided by the disclosure may be combined with each other to enable the NE and the UE to operate.

The operations of the base station or the terminal described above may be realized by including a memory device storing corresponding program codes as a component of the base station or the terminal device. That is, the base station or the controller of the terminal device may execute the operations described above, by reading and executing the program codes stored in the memory device by using the processor or a central processing unit (CPU).

The entities, various components of the base station or the terminal device, modules, etc. described in this specification may operate by using a hardware circuit, for example, a complementary metal-oxide semiconductor-based logic circuit; firmware and software; and/or a hardware circuit, such as a combination of hardware, firmware, and/or software inserted into a machine-readable medium. For example, various electrical structures and methods may be executed by using electrical circuits, such as transistors, logic gates, and an application specific integrated circuit.

When the electrical structures and methods are implemented in software, a computer-readable recording medium having one or more programs (software modules) recorded thereon may be provided. One or more programs stored in the computer-readable storage medium are configured to be executable by one or more processors in an electronic device. The one or more programs may include instructions for the electronic device to execute the methods according to the embodiments of the disclosure described in the claims and the specification.

The programs (software modules or software) may be stored in non-volatile memories including RAM, flash memory, etc., ROM, electrically erasable programmable ROM (EEPROM), a magnetic disc storage device, CD-ROM, DVDs, other optical storage devices, or magnetic cassettes. Alternatively, the programs may be stored in a memory composed of part or all of the memories described above. Also, each of the memories included in the memory may be provided in a multiple number.

The program may also be stored in an attachable storage device that may be accessed over a communication network including the Internet, an intranet, a local area network (LAN), a wide LAN (WLAN), or a storage area network (SAN), or a combination thereof. The storage device may access a device configured to perform the embodiment of the disclosure through an external port. Furthermore, a separate storage device on the communication network may access the electronic device performing the embodiment of the disclosure.

In the afore-described embodiments of the disclosure, elements included in the disclosure are expressed in a singular or plural form according to the embodiment of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

That is, it will be understood by one of ordinary skill in the art that various changes in form and details may be made based on the technical concept of the disclosure. Also, the embodiment of the disclosure may be combined to be implemented, when required. For example, portions of the methods provided by the disclosure may be combined with each other to enable the BS and the UE to operate. Also, although the aforementioned embodiments of the disclosure are proposed based on a 5G or NR system, modifications to the embodiments of the disclosure, which do not deviate from the scope of the disclosure, may be applicable to other systems such as an LTE, LTE-A, or LTE-A-Pro system, etc.

Although a specific embodiment of the disclosure has been described in the detailed description of the disclosure, various modifications may be made without departing from the scope of the disclosure. Therefore, the scope of the disclosure should not be limited to the above-described embodiment of the disclosure and should be determined by the appended claims and the equivalents thereof.

According to an embodiment of the disclosure, a network may effectively identify whether or not to reject a registration request of a UE attempting onboarding registration.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an access and mobility management function (AMF) entity in a wireless communication system, the method comprising:
    after performing a deregistration process with respect to user equipment (UE) registration for onboarding of a first UE, storing information associated with the first UE and starting a timer;
    while the timer is running, receiving, from a second UE, a UE registration request message for onboarding of the second UE;
    based on the stored information, identifying whether the first UE and the second UE are the same UE; and
    rejecting the UE registration request message, based on identifying that the first UE and the second UE are the same UE.

2. The method of claim 1, further comprising:
    after the timer expires, receiving, from a third UE, a UE registration request message for onboarding of the third UE; and
    accepting the UE registration request message for onboarding of the third UE.

3. The method of claim 1, further comprising:
    based on the UE registration request message being rejected, resetting the timer.

4. The method of claim 1, wherein the stored information comprises at least one of a subscription concealed identifier (SUCI), a subscription permanent identifier (SUPI), or a permanent equipment identifier (PEI).

5. A method performed by an equipment identity register (EIR) entity in a wireless communication system, the method comprising:
    receiving, from an access and mobility management function (AMF) entity, a message for requesting the EIR entity to store information with respect to a first user equipment (UE) identifier;
    storing the information with respect to the first UE identifier and starting a timer;
    while the timer is running, receiving, from the AMF entity, a message for requesting the EIR entity to store information with respect to a second UE identifier;
    identifying whether the second UE identifier corresponds to the first UE identifier; and
    based on identifying that the second UE identifier corresponds to the first UE identifier, transmitting, to the AMF entity, a response message comprising information indicating to the AMF entity to reject a UE registration request for onboarding of a UE corresponding to the second UE identifier.

6. The method of claim 5, further comprising:
    receiving an equipment identifier check request message comprising information with respect to a third UE identifier;
    identifying whether the third UE identifier corresponds to the first UE identifier;
    based on identifying that the third UE identifier corresponds to the first UE identifier, transmitting, to the AMF entity, an equipment identifier check response message comprising information indicating to the AMF entity to reject a UE registration request for onboarding of a UE corresponding to the third UE identifier.

7. The method of claim 5, further comprising:
    tagging an onboarding indication corresponding to the information with respect to the first UE identifier,
    wherein the response message further comprises the onboarding indication.

8. The method of claim 5, further comprising:
    identifying whether the timer expires; and
    based on identifying that the timer expires, deleting the information with respect to the first UE identifier.

9. The method of claim 5, wherein the information with respect to the first UE identifier comprises a permanent equipment identifier (PEI).

10. The method of claim 5, wherein the message for requesting the EIR entity to store the information with respect to the first UE identifier is received, after a UE registration process for onboarding of a UE corresponding to the first UE identifier is performed.

11. An access and mobility management function (AMF) entity in a wireless communication system, the AMF entity comprising:
- a transceiver; and
- at least one processor configured to:
  - after performing a deregistration process with respect to user equipment (UE) registration for onboarding of a first UE, store information associated with the first UE and start a timer,
  - while the timer is running, receive, from a second UE, a UE registration request message for onboarding of the second UE,
  - based on the stored information, identify whether the first UE and the second UE are the same UE, and
  - reject the UE registration request message, based on identifying that the first UE and the second UE are the same UE.

12. The AMF entity of claim 11, wherein the at least one processor is further configured to:
- after the timer expires, receive, via the transceiver, from a third UE, a UE registration request message for onboarding of the third UE, and
- accept the UE registration request message for onboarding of the third UE.

13. The AMF entity of claim 11, wherein the at least one processor is further configured to reset the timer, based on the UE registration request message being rejected.

14. The AMF entity of claim 11, wherein the stored information comprises at least one of a subscription concealed identifier (SUCI), a subscription permanent identifier (SUPI), or a permanent equipment identifier (PEI).

15. A method performed by an access and mobility management function (AMF) entity in a wireless communication system, the method comprising:
- after a user equipment (UE) registration process for onboarding of a UE corresponding to a first UE identifier is performed, transmitting, to an equipment identity register (EIR) entity, a message for requesting the EIR entity to store information with respect to the first UE identifier;
- transmitting, to the EIR entity, a message for requesting the EIR entity to store information with respect to a second UE identifier, wherein the second UE identifier corresponds to the first UE identifier; and
- receiving, from the EIR entity, a response message comprising information indicating to the AMF entity to reject a UE registration request for onboarding of a UE corresponding to the second UE identifier.

* * * * *